(12) United States Patent
Savel et al.

(10) Patent No.: US 11,292,404 B2
(45) Date of Patent: Apr. 5, 2022

(54) POWER SUPPLY SYSTEM INSTALLED IN A VEHICLE

(71) Applicant: Nissan Motor Co., Ltd., Yokohama (JP)

(72) Inventors: Patrick Savel, St Lambert des bois (FR); Jean Yves Stineau, Montigny-le-Bretonneux (FR)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/289,315

(22) PCT Filed: Nov. 21, 2019

(86) PCT No.: PCT/EP2019/082136
§ 371 (c)(1),
(2) Date: Apr. 28, 2021

(87) PCT Pub. No.: WO2020/109140
PCT Pub. Date: Jun. 4, 2020

(65) Prior Publication Data
US 2022/0009430 A1    Jan. 13, 2022

(30) Foreign Application Priority Data

Nov. 27, 2018  (FR) ...................................... 1871882

(51) Int. Cl.
| | | |
|---|---|---|
| *B60R 21/013* | (2006.01) | |
| *B60R 21/017* | (2006.01) | |
| *H02J 7/14* | (2006.01) | |
| *B60R 16/03* | (2006.01) | |
| *B60R 16/00* | (2006.01) | |
| *H02J 7/00* | (2006.01) | |
| *H02J 9/04* | (2006.01) | |

(52) U.S. Cl.
CPC ............ *B60R 16/03* (2013.01); *B60R 16/005* (2013.01); *H02J 7/0029* (2013.01); *H02J 7/1423* (2013.01); *H02J 7/1446* (2013.01); *H02J 9/04* (2013.01); *H02J 2310/40* (2020.01)

(58) Field of Classification Search
None
See application file for complete search history.

(56) References Cited

U.S. PATENT DOCUMENTS

| | | | | |
|---|---|---|---|---|
| 2006/0238938 | A1* | 10/2006 | Shaya | ................ H03K 17/0822 361/78 |
| 2015/0076900 | A1* | 3/2015 | Johannsen | .............. B60R 16/03 307/9.1 |
| 2015/0349471 | A1* | 12/2015 | Maki | ................... B60R 16/0215 307/10.1 |

* cited by examiner

*Primary Examiner* — Jared Fureman
*Assistant Examiner* — Aqeel H Bukhari
(74) *Attorney, Agent, or Firm* — Global IP Counselors, LLP

(57) ABSTRACT

A power supply system is installed in a vehicle having one or more sources of electrical energy. The power supply system includes at least two distributing boxes each having at least one internal distribution bus, at least two output switches and a driver processor. The internal distribution bus can be connected to the source or sources of electrical energy. The output switches for each supplies a different electrical consumer of the vehicle from the internal distribution bus. The driver processor controls the output switches so as to distribute a consumption load between the electrical consumers in association with different operating modes of the vehicle.

11 Claims, 7 Drawing Sheets

POWER SUPPLY SYSTEM INSTALLED IN A VEHICLE

CROSS-REFERENCE TO RELATED APPLICATIONS

This application is a U.S. national stage application of International Application No. PCT/EP2019/082136, filed on Nov. 21, 2019.

BACKGROUND

Technical Field

The invention relates to onboard electrical power supply networks in vehicles, in particular motor vehicles.

Background Information

Generally, such electrical power supply networks comprise one or more fuse boxes, connected at input directly or indirectly to a battery and an alternator by cables, and connected at output to different electrical consumers or groups of electrical consumers by other cables. Furthermore, many onboard computers are in turn connected to the different electrical consumers by bus-type or wired-type connection in order to control and monitor their operation.

The known architectures of electrical power supply networks have the drawback of requiring a lot of different electrical wires and cables. They also have the drawback of not being very modular. For example, adding, removing or modifying electrical consumers may necessitate a complete review of the wiring diagrams unless all future modifications have been properly foreseen. Protection fuses also have the drawback of having to be replaced after the circuit has been broken through destruction of the fuse. Replacing the fuses with reset circuit breakers as is the case in dwellings would have other drawbacks such as for example in terms of bulk or in terms of managing the distribution of energy when the many operating modes of a motor vehicle nowadays do not all necessarily require one and the same distribution of electrical energy.

SUMMARY

To overcome the drawbacks of the prior art, the subject of the invention is an onboard electrical power supply network in a vehicle comprising one or more electrical energy sources, characterized in that it comprises at least two distribution boxes each comprising at least one internal distribution bus that can be connected to the one or more electrical energy sources, at least two output switches each for supplying power to an electrical consumer distinct from the vehicle from the internal distribution bus, and a driver processor for driving the output switches so as to distribute a consumption load between the electrical consumers in association with different operating modes of the vehicle.

The distribution network according to the invention makes it possible to distribute the management of the electrical consumption of the vehicle per sets of consumers in the vicinity of each distribution box, thus making it possible to decrease, simplify and better manage the wiring.

Advantageously, at least one of the output switches comprises at least two parallel switching paths connected upstream to the internal distribution bus by a first common electrical conductor, and connected downstream by a second common electrical conductor to one of the electrical consumers.

In particular, at least one of the output switches comprises at least one switching path formed by a smart MOS transistor.

Also advantageously, the electrical power supply network comprises a coupling box connected to each electrical energy source and a set of electrical wires to connect each distribution box to each coupling box.

In articular but not necessarily when the electrical power supply network comprises at least two energy sources, each coupling box comprises:

a selector comprising a plurality of switching paths all connected upstream to the same energy source pole, and each connected downstream to an electrical wire exiting the coupling box; and a control processor for controlling the selector in order to control and monitor an on state of each path connected to that of the electrical wires to which the same energy source pole is assigned.

More particularly, a plurality of electrical wires exiting a coupling box are distributed in a common manner to at least two distribution boxes, and each of the boxes comprises:

an input switch with a plurality of parallel switching paths that are connected upstream each separately to one of the distributed wires, and are connected downstream in a grouped, sub-grouped or individual manner to a or to the internal distribution bus(es), an on state of each path being controlled and monitored by the driver processor.

Alternatively, each electrical wire exiting a coupling box is connected to one and only one internal distribution bus.

The electrical power supply network is noteworthy in that the operating modes of the vehicle comprise all or some of the modes from among parking mode, maintenance mode, logistics mode, driving mode, micro-hybridization mode, autonomous driving mode, and fault mode.

The electrical power supply network is also noteworthy in that at least one distribution box comprises a memory which contains diagnostic instructions, and which can be accessed by the driver processor in order to perform diagnostic operations.

Preferably, the electrical power supply network comprises an onboard communication bus and a central onboard computer connected to the onboard communication bus, such that each driver processor and/or each control processor accesses the onboard communication bus in order to exchange information with the central onboard computer.

In particular, each driver processor and/or each control processor executes a safety management procedure in the event of the vehicle being involved in a collision or of loss of communication with the driver processor.

Also in particular, two distribution boxes each comprise at least one voltage sensor for detecting an undervoltage and/or an overvoltage on the internal distribution bus.

A further subject of the invention is a motor vehicle comprising an electrical power supply network which reproduces the essential features of that described in the remainder of the description.

Other advantages and features of the invention will become apparent from reading the detailed description of implementations and embodiments, by way of illustrative and non-limiting examples, with reference to the appended drawings, in which:

DETAILED DESCRIPTION OF EMBODIMENTS

Figure 1:
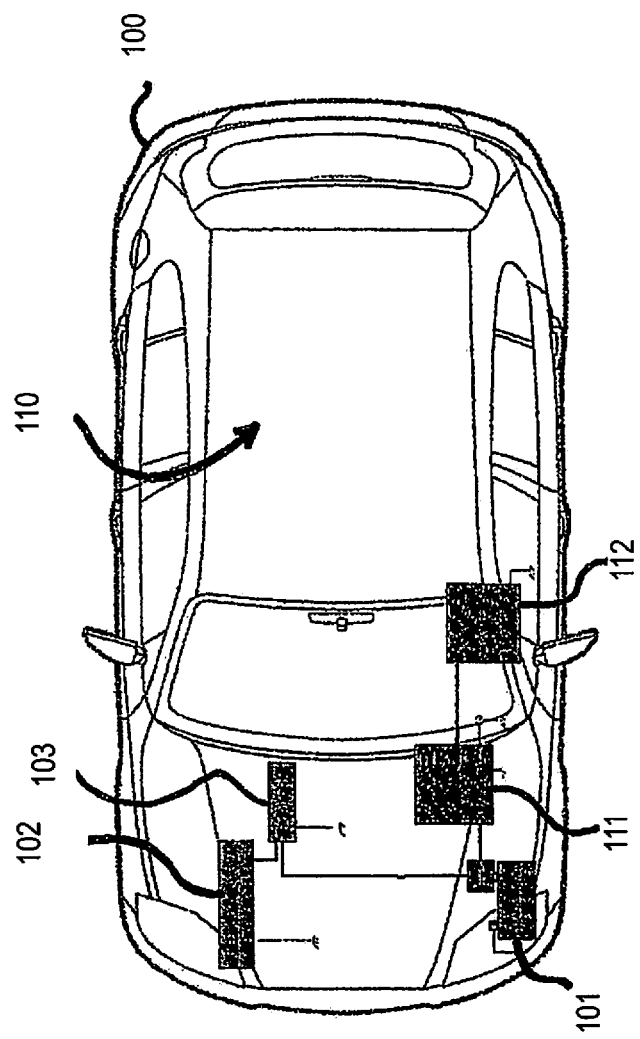
FIG. 1 illustrates a motor vehicle comprising a first implementation of an electrical power supply network according to the invention.

With reference to FIG. 1, a vehicle, in particular a motor vehicle 100, comprises an onboard electrical power supply network 110. The electrical power supply network 110 comprises an electrical energy source 101, which essentially consists of a 12 V battery. The 12 V battery is for example a lead-acid battery or a lithium-ion battery. The onboard electrical power supply network 110 comprises two distribution boxes 111, 112.

The distribution box 111, located in the engine compartment (CMO), is connected to the battery 101 to which is connected a starter 103, itself connected to an alternator 102 which may constitute another electrical energy source. The distribution box 111 is for example located on the front left (AVG) when the engine is located at the front of the vehicle. The distribution box 111 distributes the voltage from the one or more electrical energy sources to which it is connected, to electrical consumers mainly located in the engine compartment.

The distribution box 112, located in the passenger compartment, typically in the dashboard (Pdb), is connected to the distribution box 111 to distribute in turn the electrical energy to electrical consumers mainly located in the rest of the vehicle.

Figure 2:
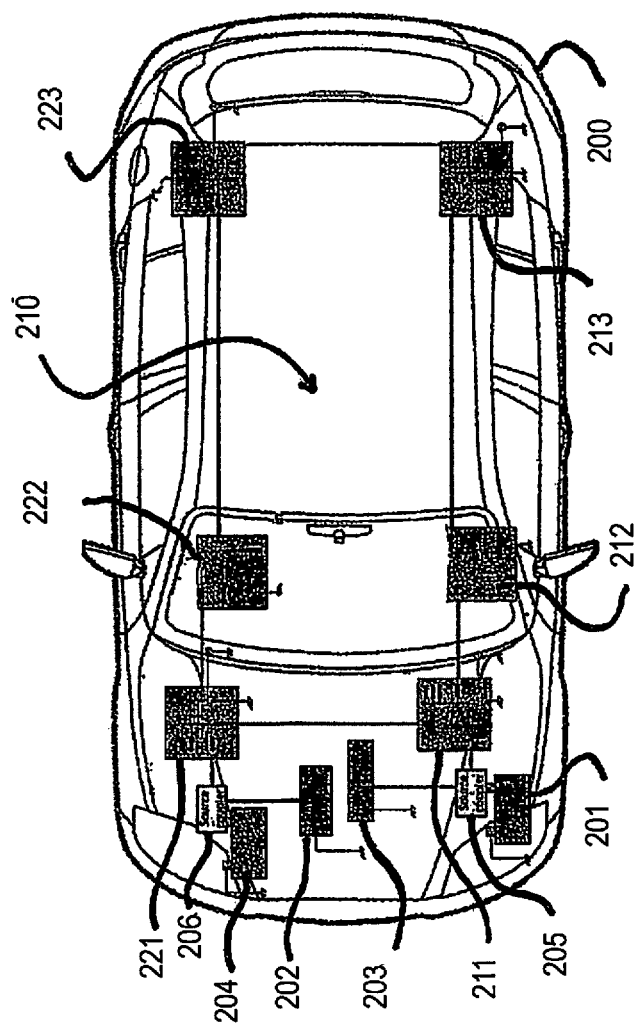
FIG. 2 illustrates a motor vehicle comprising a second implementation of an electrical power supply network according to the invention.

With reference to FIG. 2, the motor vehicle 200 comprises an onboard electrical power supply network 200. The electrical power supply network 210 comprises three electrical energy sources 201, 202, 204 which essentially consist of a 12 V main battery, a 12 V secondary battery, and of an alternator or a starter-alternator of BSG type. The energy sources are connected to the 12 V network via two source coupler boxes which allow the energy sources to be connected to or disconnected from the 12 V onboard network. The onboard electrical power supply network 210 has six distribution boxes 211, 212, 213, 221, 222, 223.

The main battery 201 and the starter 203 are connected to a first source coupler 205. The secondary battery 204 and the alternator or BSG 202 are connected to a second source coupler 206. The distribution box 211 is for example located on the front left (AVG) when the engine is located at the front of the vehicle.

The distribution box 211 is also connected to the distribution box 221, so as to distribute the voltage from the electrical energy sources to which they are connected, to electrical consumers mainly located in the engine compartment.

The distribution boxes 212, 222 located in the front portion of the passenger compartment, typically in the dashboard (Pdb) are connected respectively to the distribution box 211 and to the distribution box 221, in order to distribute in turn the electrical energy to electrical consumers mainly located in the front portion of the vehicle.

The distribution boxes 213, 223 located in the rear portion of the vehicle, respectively on the left (ARG) and on the right (ARD), are respectively connected to the distribution box 212 and to the distribution box 222, in order to distribute in turn the electrical energy to electrical consumers mainly located in the rear portion of the vehicle.

Figure 3:
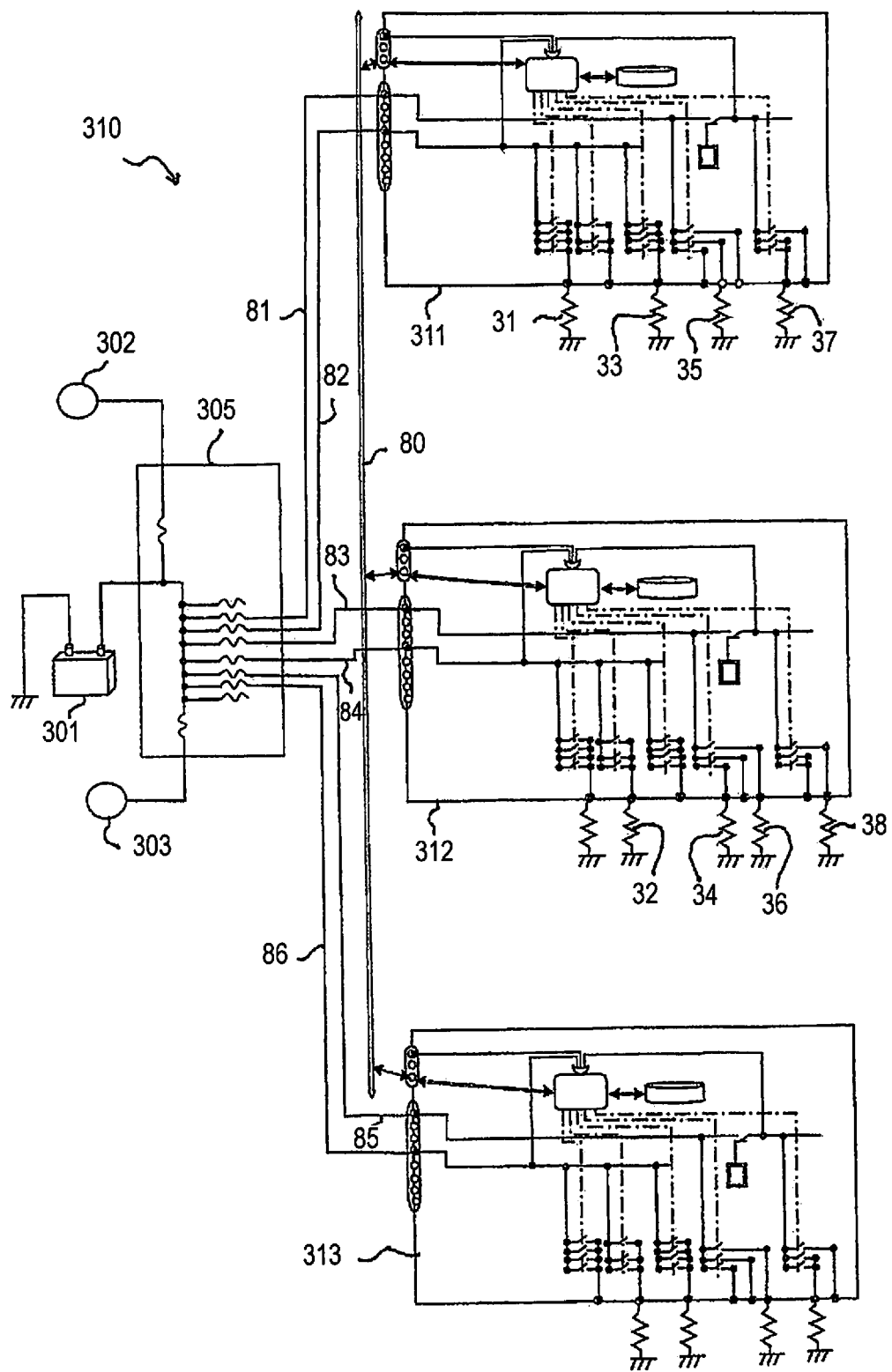
FIG. 3 shows a first variant of an electrical power supply network according to the invention.

With reference to FIG. 3, the electrical power supply networks 110, 210 may be produced more precisely in the form of an electrical power supply network 310 which comprises, by way of purely illustrative example, three distribution boxes 311, 312, 313. The explanations given below remain valid for any number of distribution boxes between two as in FIG. 1 and six as in FIG. 2, or even more.

The distribution boxes 311, 312, 313 are connected to an electrical energy source which consists of a battery 301 connected in parallel with a 12 V energy producer (alternator, starter-alternator, DC-to-DC converter, etc.) 303 over a set of electrical wires 81, 82, 83, 84, 85, 86, one or more wires making it possible to connect each of the boxes to the electrical energy source.

Figure 4:
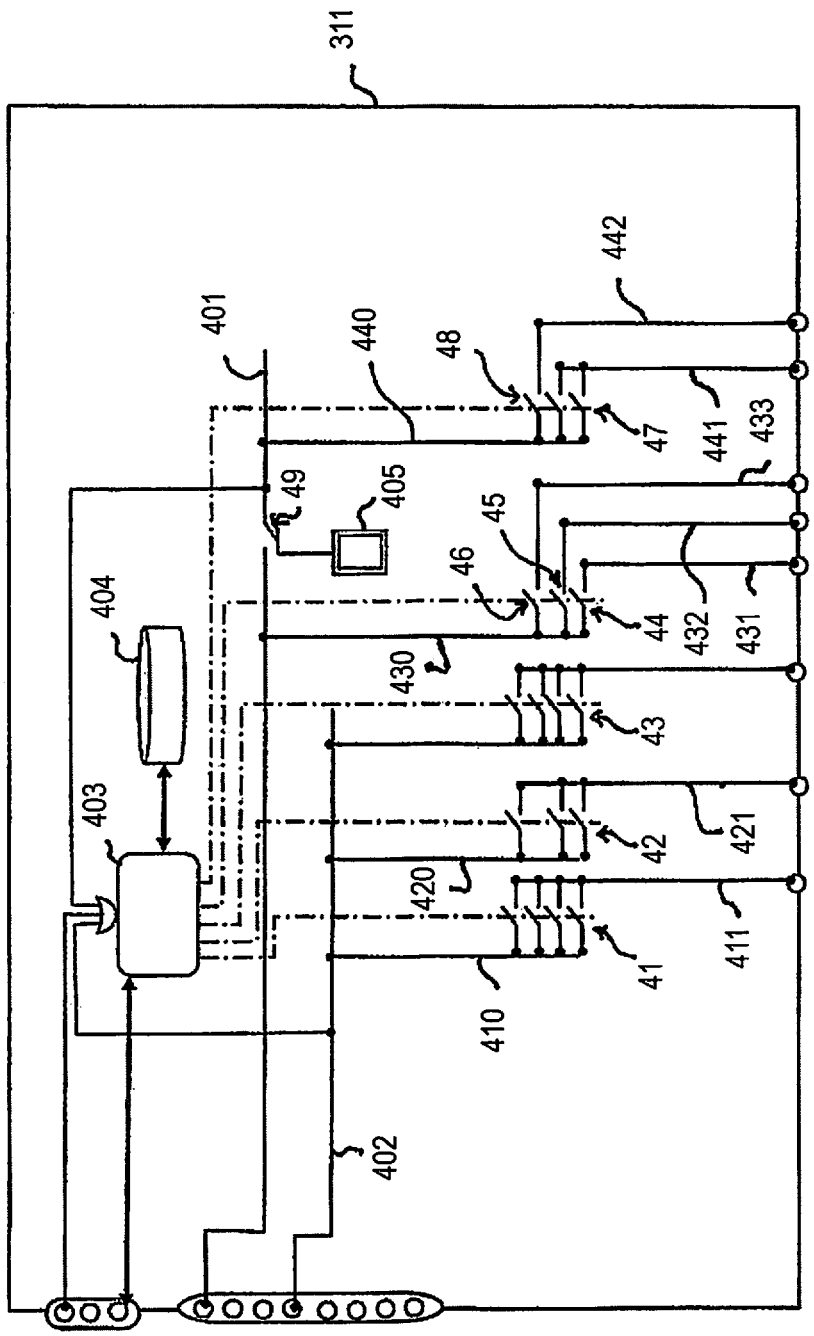
FIG. 4 shows a first distribution box which can be used in the first variant of an electrical power supply network.

The distribution boxes 312, 313 are similar to the distribution box 311 now described with reference to FIG. 4.

The distribution box 311 comprises an internal distribution bus 401 which only has to be connected to the electrical wire 81 in order to connect it to the electrical energy source formed by the battery 301 connected in parallel with the 12 V energy producer 303.

A plurality of output switches 44, 45, 46, 48 each comprise a switching path that are connected upstream to the internal distribution bus 401 by an electrical conductor 430, 440 and each connected downstream by a second electrical conductor 431, 432, 433, 442 to a distinct connector or terminal to one of the electrical consumers. For example, it can be seen in FIG. 3 that the switch 45 makes it possible to supply a consumer 35 with power from the internal distribution bus 401.

The output switch 47 comprises two parallel switching paths that are connected upstream to the internal distribution bus 401 by the common electrical conductor 440, and are connected downstream by a second common electrical conductor 441 to the electrical consumer 37. The output switch 47 thus allows the electrical consumer 37 to be supplied from the internal distribution bus 401 with a larger electric current than allowed by the switch 45 for the electrical consumer 35.

The distribution box 311 also comprises in this example an internal distribution bus 402 which only has to be connected to the electrical wire 82 in order to connect it to the electrical energy source formed by the battery 301 and the energy producer 303.

The output switches 41, 42 and 43 each comprise three or four parallel switching paths that are connected upstream to the internal distribution bus 402 by a first common electrical conductor 410, 420 and are connected downstream by a second common electrical conductor 411, 421 for distinct electrical consumers. With one more switching path than the switch 42, the output switch 41 allows an electrical consumer 31 to be supplied from the internal distribution bus 402 with a larger electric current than allowed by the switch 42 for an electrical consumer 32.

Placing a plurality of switching paths in parallel for the same switch is particularly useful for producing the switches by means of MOS (metal-oxide-semiconductor) transistors, for example metal-oxide gate field-effect transistors. MOS transistors have the advantage of having very short response times, which are valuable in the field of automotive safety. However, the low supply voltage of the order of 12 V in a motor vehicle results in high current values in order to satisfy the inrush power demand of an electrical consumer. The distribution of the current in a plurality of switching paths in parallel makes it possible to satisfy a current demand while passing a smaller current through each transistor.

A driver processor 403 controls the opening and closing of the single switching path of each output switch 44, 45, 48, or simultaneously of all the switching paths of each of the output switches 41, 42, 43, 47, so as to distribute a consumption load between the electrical consumers in association with different operating modes of the vehicle.

Producing a switching path by means of a smart MOS transistor makes it possible to locally manage temperatures, current values, voltage values, and to communicate with the driver processor, both in terms of control/monitoring and of instrumentation.

The chip associated with the power MOS transistor may comprise a temperature probe for the junction of the MOS transistor and a microprocessor capable of reading a temperature value measured by the probe and of switching the MOS transistor off so as to open the switching path in order to protect the power MOS transistor in the event of overheating of its internal junction, for example as soon as the measured temperature reaches or exceeds 150° C. The chip associated with the power MOS transistor may also comprise an electric current probe for the electric current through the junction of the MOS transistor which is accessible to the microprocessor which drives the MOS transistor by switching it off so as to open the switching path in order to protect the power MOS transistor in the event of overcurrent through its internal junction. It is also possible to program the microprocessor so as to limit the current to a parameterizable maximum value for a short time so as to allow certain transient behaviors. The chip associated with the power MOS transistor may also include a voltage probe at the output of the junction of the MOS transistor. The microprocessor can open the switching path by controlling the MOS transistor so as to be in the off state in order to protect the power MOS transistor in the event of a parameterizable voltage threshold being exceeded. The chip is equipped with digital and/or analog interfaces for receiving control instructions from the driver processor, and for communicating data relating to temperature, amperage, voltage in real time and to threshold crossing alerts to the driver processor.

Figure 5:
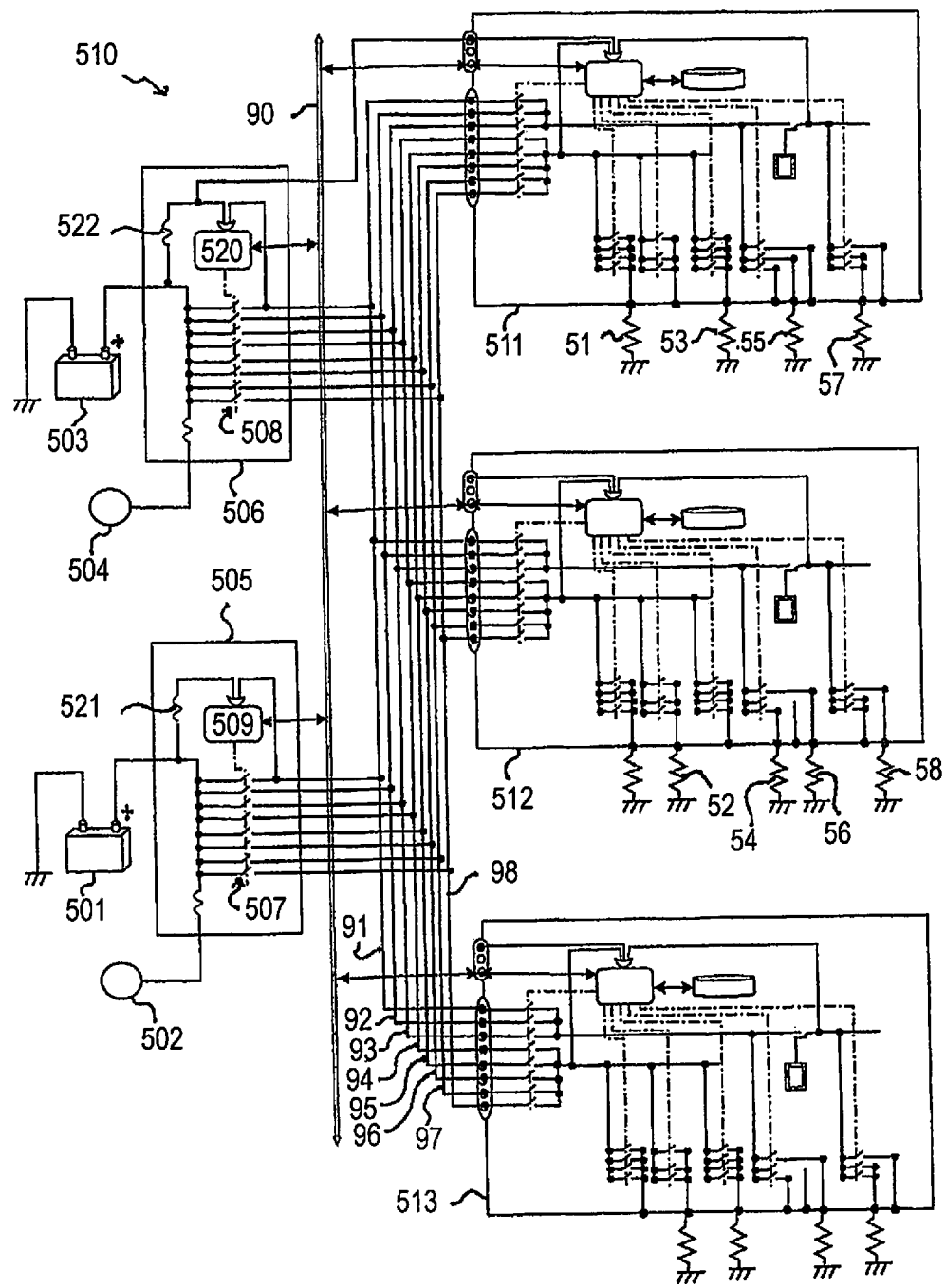
FIG. 5 shows a second variant of an electrical power supply network according to the invention.

With reference to FIG. 5, the electrical power supply networks 110, 210 or other onboard power supply networks may also be produced in the form of an electrical power supply network 510 which comprises, here again by way of purely illustrative example, three distribution boxes 511, 512, 513.

The electrical power supply network 510 differs from the electrical power supply network 310 essentially in that it comprises two electrical energy sources. A first electrical energy source consists of a main battery 503, connected in parallel with a starter 504 upstream of a first coupling box 506. A second electrical energy source consists of an additional, emergency battery 503, connected in parallel with a starter 504 upstream of a second coupling box 506.

Each coupling box 505, 506 respectively comprises a selector 507, 508 comprising a plurality of switching paths, eight in the illustrative example of FIG. 5, each connected downstream to an electrical wire exiting the coupling box. Each of the electrical wires exiting the coupling box 505 is connected, for example here by splicing, to an electrical wire 91, 92, 93, 94, 95, 96, 97, which is itself connected to an electrical wire of the coupling box 506. The switching paths of the selector 507 are all connected upstream to the same +pole of the battery 501. The switching paths of the selector 508 are all connected upstream to the same +pole of the battery 503.

A control processor 509 for controlling the selector 507 makes it possible to control and monitor an on or off state, respectively, of each path connected to that of the electrical wires to which the +pole of the energy source formed by the battery 501 and/or the energy producer 502 is or is not assigned, respectively.

A control processor 520 for controlling the selector 508 makes it possible to control and monitor an on or off state, respectively, of each path connected to that of the electrical wires to which the +pole of the energy source formed by the battery 503 is assigned or is not assigned, respectively.

The two processors 509, 520 communicate with each other by means of an onboard communication bus 90, so as to control the switching paths of each selector 507, 508 so that each electrical wire 91, 92, 93, 94, 95, 96, 97 is preferably brought to the electrical potential of at most one electrical energy source. For example in the emergency operating mode of the vehicle, the processor 509 controls all of the paths of the selector 507 so that they are in the off state while the processor 520 controls all of the paths of the selector 508 so that they are in the on state such that the electrical power supply network 510 is supplied with power only by the second energy source. For example, in the energy distribution operating mode of the vehicle, the processor 509 controls the paths of the selector 507 which are connected to the electrical wires 91, 92, 93 so that they are in the on state and the paths of the selector 507 which are connected to the electrical wires 94, 95, 96, 97, 98 so that they are in the off state, while the processor 520 controls the paths of the selector 508 which are connected to the electrical wires 91, 92, 93 so that they are in the off state and the paths of the selector 508 which are connected to the electrical wires 94, 95, 96, 97, 98 so that they are in the on state such that the electrical power supply network 510 is supplied with power in a shared manner by the first energy source. It is also possible to envisage controlling all or some identical switching paths of the two selectors 507, 508 so as to be in the on state, for example in order to recharge the additional battery 503 from the energy producer 502.

The processors 509, 520 are each supplied with power upstream respectively from the selector 507, 508 in a manner protected by a fuse 521, 522, and/or downstream respectively from the selector 507, 508 in a manner protected by one of the switching paths.

In an alternative embodiment, the distribution boxes 512, 513 are similar to the distribution box 511 now described with reference to FIG. 6.

The distribution box 511 comprises one or two internal distribution buses 601, 602 comparable to the one or more internal distribution buses 401, 402.

A plurality of output switches 64, 65, 66, 67, 68 each comprise one or two switching paths that are connected upstream to the internal distribution bus 601 in a manner comparable to the output switches 44, 45, 46, 47, 48 in order to supply power to the consumer 54, 55, 56, 57, 58 from the internal distribution bus 601.

The distribution box 511 also comprises in this example an internal distribution bus 602. The output switches 61, 62 and 63 each comprise three or four parallel switching paths connected upstream to the internal distribution bus 602 by a first common electrical conductor 610, 620 and connected downstream by a second common electrical conductor 611, 621 for distinct electrical consumers. With one more switching path than the switch 62, the output switch 61 allows an electrical consumer 51 to be supplied from the internal distribution bus 602 with a larger electric current than allowed by the switch 62 for an electrical consumer 53.

Placing a plurality of switching paths in parallel for one and the same switch is particularly useful for producing the switches by means of MOS (metal-oxide-semiconductor) transistors, for example metal-oxide gate field-effect or Smart-MOS™ transistors, like for the switches of the box 311.

A driver processor 603 controls the opening and closing of the single switching path of each output switch 64, 65, 68, or simultaneously of all of the switching paths of each of the output switches 61, 62, 63, 67, so as to distribute a consumption load between the electrical consumers in association with the different operating modes of the vehicle.

Figure 6:
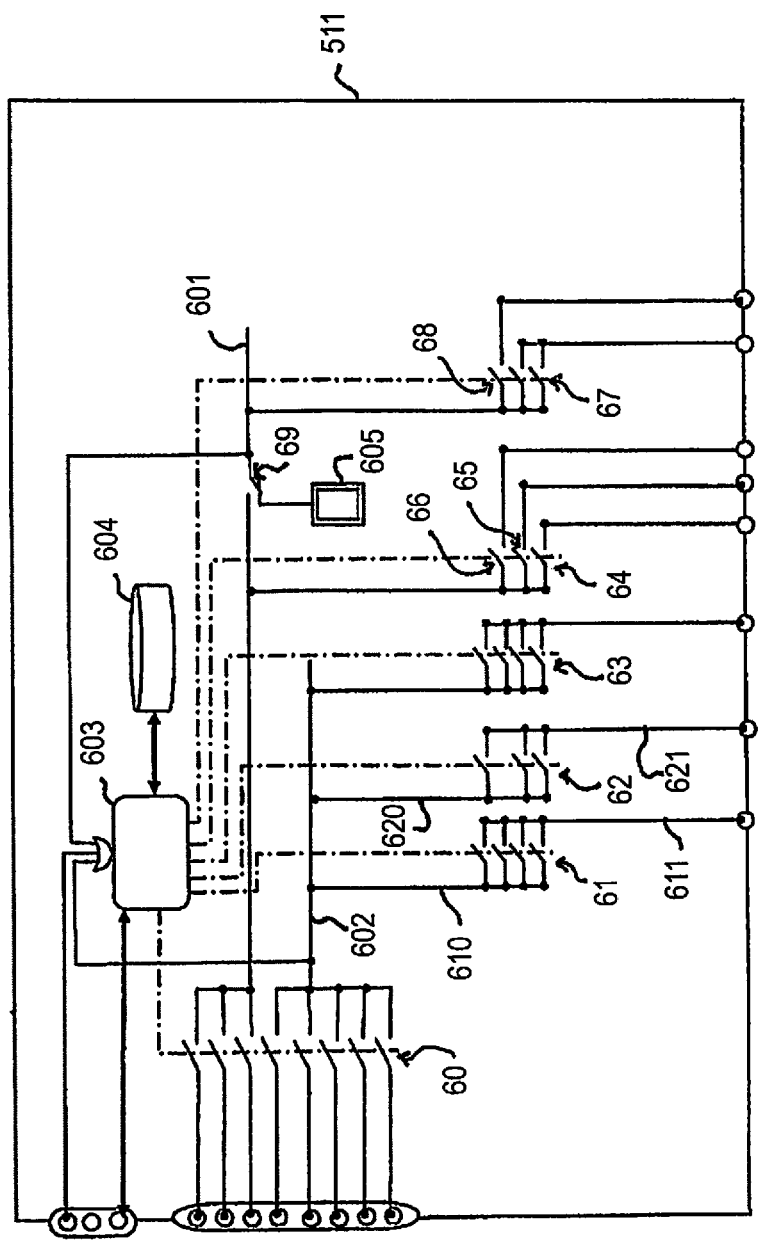
FIG. 6 shows a second distribution box which can be used in the second variant of the electrical power supply network.

However, while the box 311 is more suitable for an electrical power supply network in which each electrical wire exiting the coupling box 305, 505, 506 is connected to one and only one internal distribution bus, the box 511 shown in FIG. 6 is better suited to an electrical power supply network in which a plurality of electrical wires exiting the coupling box 305, 505, 506 are distributed in a common manner to at least two similar distribution boxes 511, 512, 513.

The boxes 512, 513, which are identical to the box 511 shown in FIG. 6, differ essentially from the box 311 in that each one comprises an input switch 60 with a plurality of parallel switching paths that are connected upstream each separately to one of the distributed wires 91, 92, 93, 94, 95, 96, 97, 98, and are connected downstream in a grouped, sub-grouped or individual manner to the one or more internal distribution buses 601, 602. The driver processor 603 controls and monitors an on state and an off state of each path so as to determine which of one or more from a first set of electrical wires 91, 92, 93 is connected or not connected to the internal distribution bus 601, and which of one or more from a second set of electrical wires 94, 95, 96 is connected or not connected to the internal distribution bus 602.

Boxes 311, 312, 313 identical to the box 511 shown in FIG. 6 may be used in the network 310 in order to share each conductor 81 to 86 with each box 311, 312, 313. In other words, it is possible also to use boxes identical to the box 511 in the presence of a single electrical energy source.

In another alternative embodiment, the distribution boxes 211, 212, 213, 221, 222, 223 are similar to the distribution box 221 now described with reference to FIG. 7.

Figure 7:
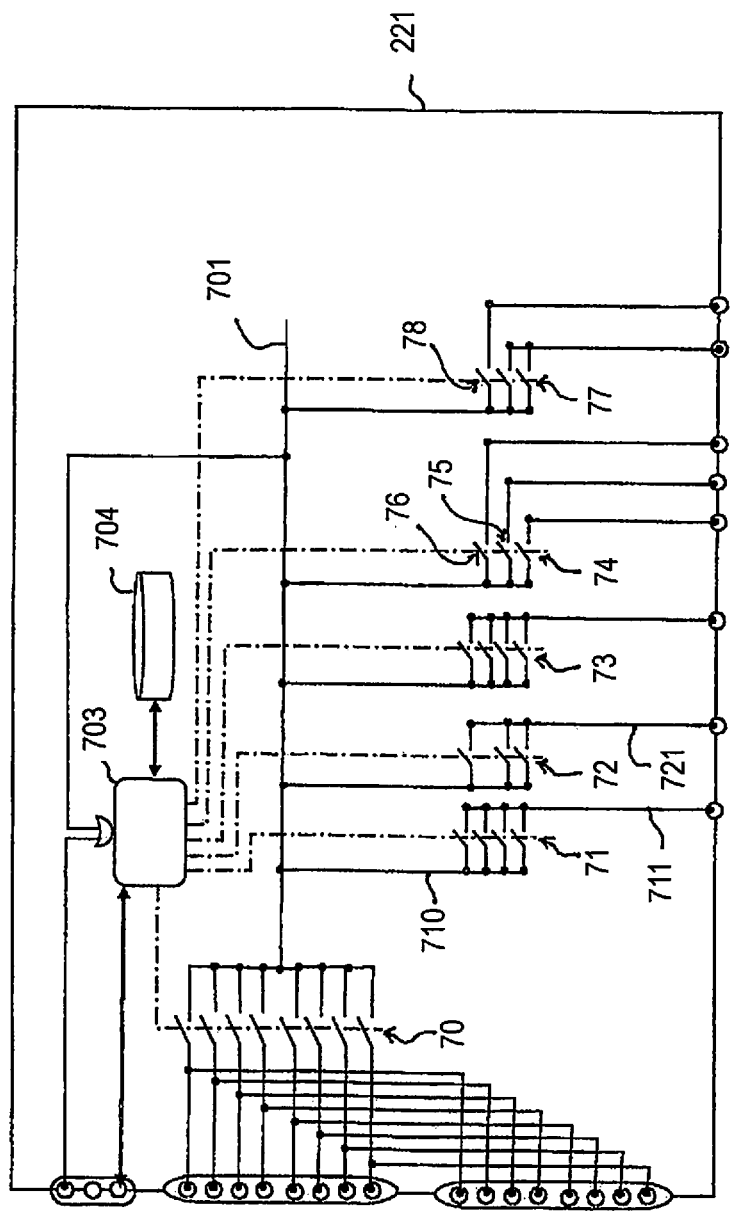
FIG. 7 shows a third distribution box which can be used in the second variant of the electrical power supply network.

The distribution box illustrated in FIG. 7 comprises a single internal distribution bus 701 to which are connected a plurality of switches 71, 72, 73, 74, 75, 76, 77, 78 with open and closed states which are controlled and monitored by a processor 703. Certain switches 74, 75, 76, 78 have just one switching path. Certain switches 71, 72, 73, 77 have at least two switching paths. For example, the output switch 71 comprises four parallel switching paths connected upstream to the internal distribution bus 701 by a first common electrical conductor 710, and connected downstream by a second common electrical conductor 711 to one of the electrical consumers. For example again, the output switch 72 comprises three parallel switching paths connected upstream to the internal distribution bus 701 by a first common electrical conductor, and connected downstream by a second common electrical conductor 721 to another of the electrical consumers.

In a manner comparable to the box 511 shown in FIG. 6, the distribution box 221 shown in FIG. 7 comprises an input switch 70 with a plurality of parallel switching paths to be connected upstream each separately for example to one of the distributed wires 91, 92, 93, 94, 95, 96, 97, 98, and connected downstream in a grouped manner to the internal distribution bus 701. The driver processor 703 controls and monitors an on state and an off state of each path so as to determine which of one or more from the set of electrical wires 91, 92, 93, 94, 95, 96 is or is not connected to the internal distribution bus 701.

Unlike the box 511 shown in FIG. 6, the distribution box 221 shown in FIG. 7 comprises two input connectors, to each of which is connected the upstream of each of the switching paths of the input switch 70. The first connector allows the distribution box 221 to be brought to the electrical potential delivered by an electrical energy source or delivered by another distribution box. The second connector allows the distribution box 221 to deliver the electrical potential to which it is brought over the first connector to another distribution box. The dual connector makes it possible to avoid performing splices on the cables connecting the electrical distribution boxes.

The distribution boxes 311, 511, 221 respectively comprise a memory 404, 604, 704 which is accessed by the processor 403, 603, 703 in order to write data therein, and in order to read data therein or to execute computer instructions which are stored therein.

The data to be written into memory may come from the onboard communication bus 80, 90 to which the processors of the connection boxes are connected. The data to be written into the memory may also come from the execution of the stored computer instructions or from measurement signals relating to the electrical power supply network. For example, two distribution boxes each comprise a voltage sensor for detecting an undervoltage and/or an overvoltage on the internal distribution bus. The memory may also contain diagnostic instructions, which can be accessed by the driver processor in order to perform diagnostic operations.

A central onboard computer (not shown) may advantageously be connected to the onboard communication bus 80, 90 in order to manage different operating modes of the vehicle, comprising all or some of the modes from among parking mode, maintenance mode, logistics mode, driving mode, micro-hybridization mode, autonomous driving mode, and fault mode.

Each driver processor 303, 503 in a distribution box 311, 511, and/or each control processor 509, 520, accesses the onboard communication bus 80, 90 in order to exchange information with the central onboard computer, in particular in order to receive instructions for distributing electrical energy between the different electrical consumers connected to each distribution box.

Each driver processor 403, 603, 703, and/or each control processor 509, 520, may also receive, via the onboard communication bus or directly via dedicated wires, a vehicle collision detection alert, so as to execute a safety management procedure in the event of the vehicle being involved in a collision. The safety management procedure, for example stored in memory 404, 604, 704, may consist in switching off all or some of the switches 41 to 48 or in switching off all or some of the switching paths of the input switch 60, 70. A micro-relay 49, 69, with a failure contact that disconnects an end portion of the bus 401, 601 from the electrical wires 81, 91, 92, 93 at input, so as to connect the end portion of the bus to a battery or mini-battery 405, 605, allows the processor 403, 603 to be supplied with power in the absence of potential from one of the electrical energy sources. Provision may be made in the safety procedure to keep a limited number of output switches 47, 48, 67, 68 that are connected at the end of the bus 401, 601 on.

To perform firmware-over-the-air (FOTA) software modifications, it is advantageous to arrange each distribution box so as to check whether the electrical consumers affected by a firmware-over-the-air modification are connected or not connected to its outputs. It is possible to implement this type of check by means of associative tables stored in memory 404, 604.

The invention claimed is:

1. An onboard electrical power supply network for a vehicle having a plurality of electrical energy sources, the onboard electrical power supply network comprising
   at least two distribution boxes, each of the at least two distribution boxes comprising:
      at least one internal distribution bus that can be connected to the electrical energy sources;
      at least two output switches each for supplying power to at least one electrical consumer distinct from the vehicle from the internal distribution bus; and
      a driver processor configured to drive the output switches so as to distribute a consumption load between the electrical consumers in association with different operating modes of the vehicle,
   the network comprising a coupling box connected to each electrical energy source and a set of electrical wires to connect each of the distribution boxes to each of the coupling boxes,
   each of the coupling boxes comprising:
      a selector comprising a plurality of switching paths all connected upstream to the same pole of an energy source, and each connected downstream to an electrical wire exiting a corresponding one of the coupling boxes; and
      a control processor configured to control the selector in order to control and monitor an on/off state of each path connected to that of the electrical wires to which the same energy source pole is assigned.

2. The electrical power supply network as claimed in claim 1, wherein
   at least one of the output switches comprises at least two parallel switching paths connected upstream to the internal distribution bus by a first common electrical conductor, and connected downstream by a second common electrical conductor to one of the electrical consumers.

3. The electrical power supply network as claimed in claim 1, wherein
   at least one of the output switches comprises at least one switching path formed by a smart MOS transistor.

4. The electrical power supply network as claimed in claim 1, wherein
   each of the electrical wires exiting a coupling box is connected to one and only one internal distribution bus.

5. The electrical power supply network as claimed in claim 1, wherein
   a plurality of electrical wires exiting the coupling boxes are distributed in a common manner to the at least two distribution boxes (511, 512, 513), and in that each of the at least two distribution boxes comprises:
   an input switch with a plurality of parallel switching paths that are connected upstream each separately to one of the distributed wires, and are connected downstream in a grouped, sub-grouped or individually to or to one of the internal distribution buses, an on state of each path being controlled and monitored by one of the driver processors.

6. The electrical power supply network as claimed in claim 1, wherein
   the operating modes of the vehicle comprise at least one of a parking mode, a maintenance mode, a logistics mode, a driving mode, a micro-hybridization mode, an autonomous driving mode, and a fault mode.

7. The electrical power supply network as claimed in claim 1, wherein
   at least one of the distribution boxes comprises a memory (404, 604, 704) which contains diagnostic instructions, and which can be accessed by the driver processor in order to perform diagnostic operations.

8. The electrical power supply network as claimed in claim 1, further comprising
   an onboard communication bus, and a central onboard computer connected to the onboard communication bus, and in that at least one of the driver processors and the control processors accesses the onboard communication bus in order to exchange information with the central onboard computer.

9. The electrical power supply network as claimed in claim 1, wherein
   at least one of the driver processors and the control processor, executes a safety management procedure in an event of the vehicle being involved in a collision or of loss of the communication bus.

10. The electrical power supply network as claimed in claim 1, wherein
    the at least two distribution boxes each comprise a voltage sensor for detecting at least one of an undervoltage and an overvoltage on the internal distribution bus.

11. A motor vehicle comprising an electrical power supply network as claimed in claim 1.

* * * * *